Aug. 14, 1962 P. C. SHERBURNE 3,049,325
GAS MOTOR DRIVEN POSITIONER
Filed Sept. 25, 1959 4 Sheets-Sheet 1

INVENTOR.
PHILIP C. SHERBURNE
BY
David D. McKenney
ATTORNEY

Aug. 14, 1962  P. C. SHERBURNE  3,049,325
GAS MOTOR DRIVEN POSITIONER
Filed Sept. 25, 1959  4 Sheets-Sheet 2

INVENTOR.
PHILIP C. SHERBURNE
BY
David D. McKenney
ATTORNEY

Aug. 14, 1962  P. C. SHERBURNE  3,049,325
GAS MOTOR DRIVEN POSITIONER
Filed Sept. 25, 1959  4 Sheets-Sheet 3
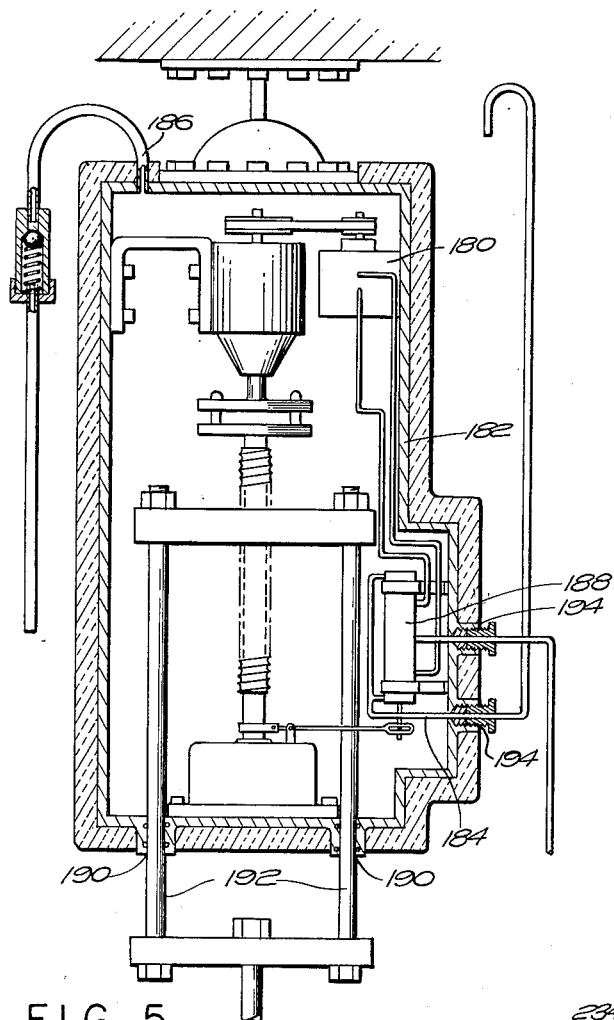
FIG. 5
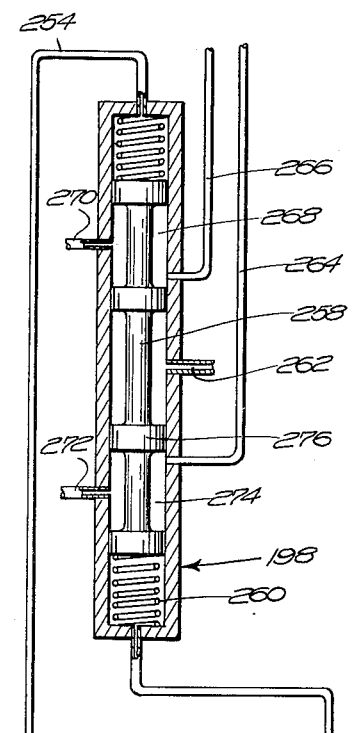
FIG. 6
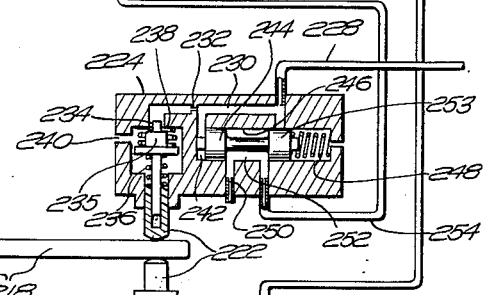
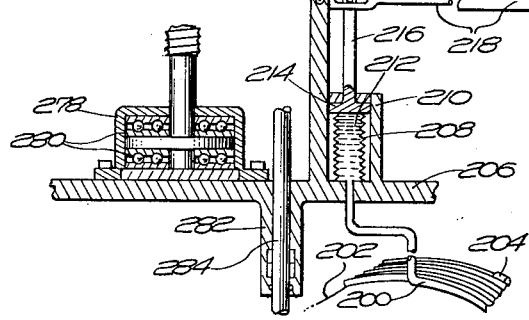
INVENTOR.
PHILIP C. SHERBURNE
BY
David D. McKenney
ATTORNEY

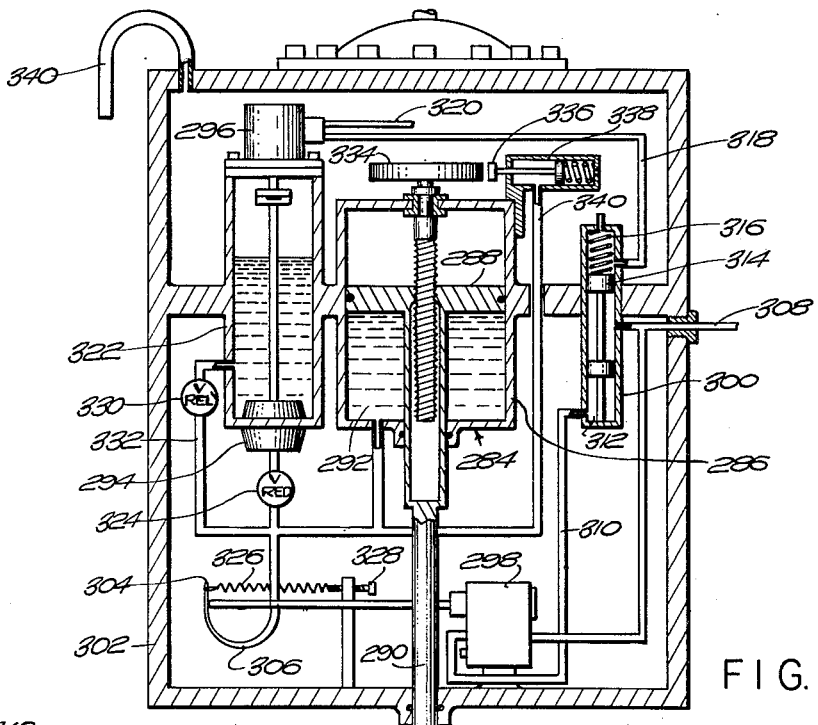
FIG. 7
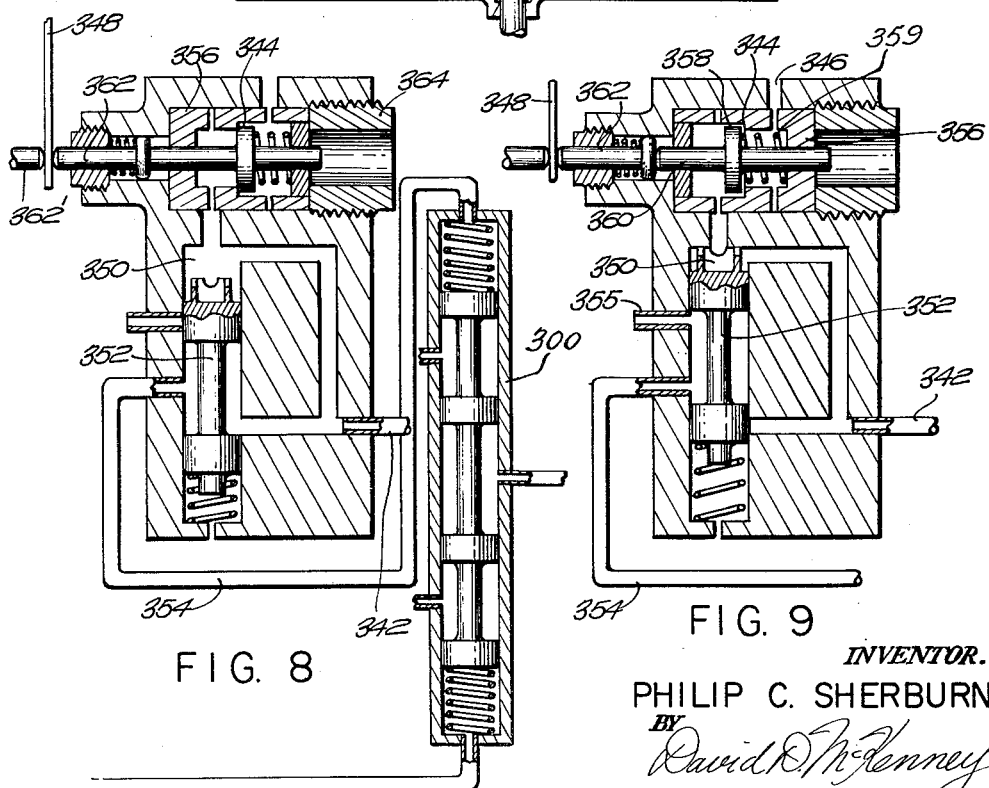
FIG. 8
FIG. 9
INVENTOR.
PHILIP C. SHERBURNE
BY David R. McKenney
ATTORNEY United States Patent Office 3,049,325
Patented Aug. 14, 1962

3,049,325
GAS MOTOR DRIVEN POSITIONER
Philip C. Sherburne, Rumford, R.I., assignor to Grinnell Corporation, Providence, R.I., a corporation of Delaware
Filed Sept. 25, 1959, Ser. No. 842,303
11 Claims. (Cl. 248—58)

This invention relates to improvements in motor-driven devices for changing the position of fluid handling system equipment in accordance with changes in the temperature of such equipment.

Devices of this kind have particular utility in changing the position of oil and chemical pipe lines and vessels in petroleum refinery plants and in changing the position of steam lines in power plants when the expansion and contraction of such equipment caused by temperature increases and decreases produce dangerous stresses at certain critical points in the system. By employing these devices to move portions of the equipment to predetermined portions for each temperature the stresses at the critical points are kept at safe values.

One difficulty with prior proposed devices of this kind is that they have employed electric motors to position the equipment directly or to drive fluid pumps which position the equipment hydraulically. For many services such electric motors and the associated electrical switches and conductors are completely satisfactory. However, in oil refineries particular care must be taken to protect equipment from the effects of occasional flash fires, and although electrical components can be protected to a certain extent the necessary insulation casing for this purpose is expensive and cumbersome and has the unfortunate effect of preventing the escape of heat generated by the electrical components themselves. Heat dissipation by circulating fans has been considered, but this in turn has the disadvantage of drawing into the insulated housing for the electrical components a constant stream of air which may be corrosive at ordinary times and which at the time of a flash fire may include very hot gases, smoke and possibly flame.

In addition in refineries and power plants these devices may be used in areas which are subject to flooding in the event of a ruptured pipe or vessel. This possibility requires a fluid tight protective casing with the problem of the change in air volume within the casing during operation of the positioner and the problem of removing heat generated by electric components.

Also in plants where radio-active material is being handled electrical equipment exposed to radiation is adversely effected, principally because a great many organic materials used for electrical insulation have their physical properties changed, usually becoming either soft or brittle.

It is an object of the present invention to overcome these difficulties by employing a gas motor to drive the fluid handling equipment positioner and by employing non-electrical control valves for controlling the supply of gas to such motor. Compressed air is normally available in plants, such as oil refineries and power stations, where equipment must be positioned in accordance with changes in temperature. Pipes leading this compressed air to air-motor driven positioning devices are particularly invulnerable to flash fires, flooding and radiation, so that even under these adverse conditions a positioning device in accordance with this invention may continue to receive energy.

It is another object to provide a casing for a gas motor driven positioning device which sealingly encloses the parts most susceptible to damage from corrosive atmosphere, fire gases and flooding, including the gas motor and gas control valves, except for a vent leading from the interior to the exterior of the casing through which leakage from the gas motor and valves can escape from the casing, so that pressure which would rupture the casing or interfere with motor operation will not build up and so that changes in air volume within the casing during operation are compensated.

Another object of the invention is to provide a vented casing for a gas motor driven positioning device which sealingly encloses the parts most susceptible to damage from corrosive atmosphere, fire and flooding, including the gas motor and control valves, and to exhaust the gas from the gas motor into the space within the casing, so that there is a substantial flow of gas out of the casing through the vent.

Another object of the invention is to provide an apertured casing for a gas motor driven positioning device which substantially encloses the parts most susceptible to damage from corrosive atmosphere and fire, including the motor and control valves, and to introduce gas under pressure into the space within the casing so that there is a substantial flow of gas out of the casing through the apertures.

Another object is to provide a vented casing for a gas motor driven positioning device which sealingly encloses the parts most susceptible to damage and which has therein a gas motor with an expanding high pressure chamber, a contracting exhaust chamber and a third chamber in which the pressure opposes the expansion of the high pressure chamber.

Another object is to provide a gas motor driven positioning device and compressed gas supply in which filters are provided in the supply to remove water, oil and other material from the gas before it is introduced into the motor, so that any gas introduced into the casing is free of any substances which might be harmful to the mechanism of the device.

Another object is to provide a gas motor driven positioning device with a vented casing in which compressed gas is introduced into the casing even when the motor is turned off.

Another object of the invention is to provide a gas motor driven positioning device with a single main control valve which turns the gas motor on and off and reverses the motor.

Another object is to provide a gas motor driven positioning device with a single control valve which controls the supply of compressed gas to the gas motor and which is actuated in accordance with changes in the temperature of the equipment being positioned.

Another object is to provide a gas motor driven positioning device with a main control valve operated by supplemental pilot valves.

Other objects will appear hereinafter.

The accompanying drawings show and the following specification describes preferred embodiments of the present invention.

In the drawings:

FIGURE 4 is a side elevation view like FIG. 1 but showing another embodiment of a positioner in accordance with the present invention;

FIGURE 5 is a side elevation view like FIG. 1 but showing still another embodiment in accordance with the invention;

FIGURE 6 is a side elevation view partially in cross section showing another arrangement of valves for the gas motor;

FIGURE 7 is a side elevation view like FIG. 1 but showing another embodiment of the invention in which an hydraulic jack is employed; and FIGURES 8 and 9 are cross sectioned side elevation views of a novel pilot valve which can be employed to advantage in the present invention.

Figures 1, 2:
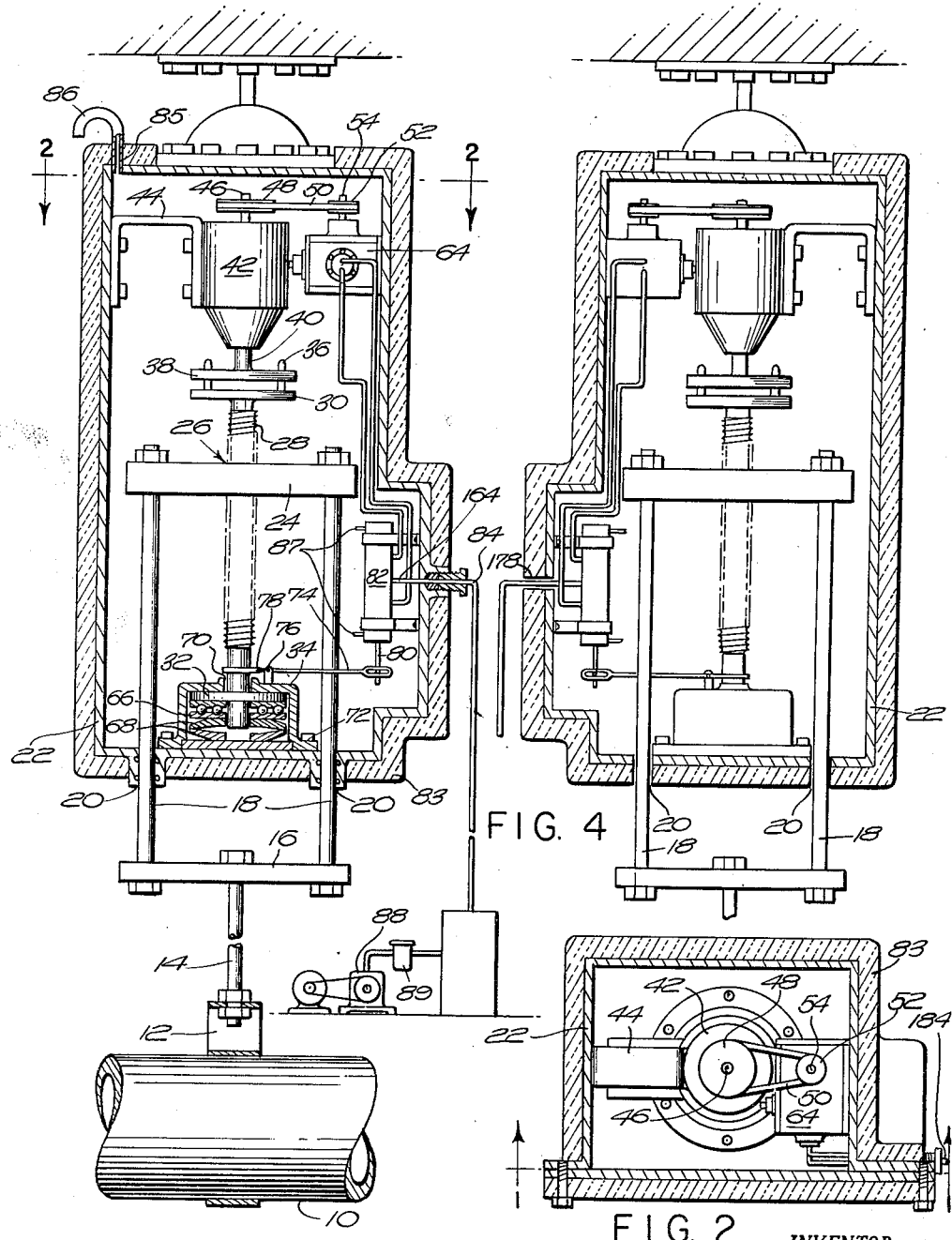
FIGURE 1 is a side elevation view, partly in cross section, showing one embodiment of a gas motor driven fluid handling equipment positioner in accordance with the present invention.
FIGURE 2 is a cross sectioned plan view taken on line 2—2 of FIG. 1.

Referring now the drawings, and more particularly to FIG. 1, the fluid handling equipment which is to be positioned is a pipe section 10 of a piping system such as might be employed in an oil refinery or power station to carry steam or other hot fluid. For simplifying the explanation of the invention it is assumed in this case that the stresses at the critical points in the piping system (usually the end connections) will not exceed safe values during system temperature changes if the pipe weight is supported in each position of the pipe in a range of positions resulting from thermal expansion and contraction, and accordingly the positioning device of FIG. 1 is employed as a weight supporting hanger which is sensitive to and controlled by changes in load in the manner hereinafter described.

Attached to the pipe section 10 is a clamp 12 which is in turn connected by a rod 14 to the center of a cross bar 16 of the device. The ends of this cross bar are carried on the lower ends of a pair of rods 18 which extend vertically and pass slidably upward through sealed apertures 20 in a frame-casing 22 and having their upper ends within the casing secured to the ends of another cross bar 24 which corresponds to cross bar 16. The center of this cross bar 24 has a threaded aperture 26 which receives a vertical screw member 28 the upper end of which is provided with a coupling plate 30 and the lower end of which has a flange 32 located within a mounting unit 34 resting on the bottom of the frame casing between the apertures 20.

The coupling plate 30 carries a number of upward projecting vertical pins 36 which are slidably received in apertures in a second coupling plate 38 parallel to and spaced part from the coupling plate 30 and carried on the output shaft 40 of a speed reducing gear unit 42 which is so mounted on a bracket 44 on the side wall of the frame casing 22 that the axis of the output shaft 40 coincides with the axis of the screw member 28.

The input shaft 46 of the speed reducing gear unit 42 is provided with a pulley 48, driven by a belt 50 which is in turn driven by another pulley 52 fixed to the output shaft 54 of an air motor 64 mounted on the side of the frame casing 22.

The mounting unit 34 which encloses the flange 32 on the lower end of the screw member 28 contains a thrust bearing 66 and a set of nested Belleville springs 68, as shown, so that the screw member can rotate freely under load and move slightly up and down with respect to the mounting unit as the load changes. The aperture 70 by which the screw member enters the mounting-unit housing serves as a journal bearing for this end of the screw member. This housing is secured to the frame casing 22 by bolts 72.

A lever 74 pivotally mounted at 76 on the mounting unit housing and pivotally connected at one end 78 to the screw member exterior to the housing has its other end pivotally connected to the piston rod 80 of a control valve 82. In general this valve operates to turn on the air motor in one direction or the other to maintain a substantially constant load supporting force on the pipe. Thus, for example, if a change in the temperature of the piping system causes the pipe section 10 to be moved upward slightly from the position shown because of changes in the lengths of adjacent pipe sections caused by thermal expansion or contraction, the force exerted on the deflected springs 68 will decrease and these springs will raise the screw member 28 slightly with respect to the mounting unit. If this movement is sufficient, indicating perhaps a decrease of 2% in the force exerted on the springs 68, the lever 74 will be rotated clockwise (in FIG. 1) sufficiently far to operate the control valve 82 to turn on the air motor 64 in that direction which turns the screw member 28 to move the cross bar 24 upward. The rate of this upward movement of the cross bar 24 is arranged to exceed the greatest rate of upward movement of the pipe due to thermal expansion so that a short time after the air motor is turned on the force exerted on the springs 68 beings to increase, deflecting these springs and causing the lever 74 to move counterclockwise, closing the valve 82. Thus the deflection of springs 68 is prevented from decreasing more than a predetermined amount which in this case would represent an undersupport for the load of 2%.

The same valve 82 also controls the motor when the thermal contraction of the piping system causes the pipe section 10 to move downward. This operation is substantially the reverse of that above described. Such downward pipe section movement additionally deflects the springs 68 which results in counterclockwise rotation of lever 74. When this rotation is sufficient the valve 82 turns on the air motor to turn the screw member to move the cross bar 24 down. This relieves some of the force on the springs 68 and when the original deflection is restored, indicating achievement of the load support for which the device is set, the lever has rotated clockwise enough to operate the valve 82 to again turn off the air motor 64. In this manner the valve 82 control the air motor to maintain a substantially constant supporting force on the pipe load as the pipe moves up and down due to thermal expansion of the piping system.

For the mechanism of FIG. 1 the frame casing 22 can be a simple metal casing without protective heat insulation material thereon, because the components within the casing will be undamaged by any but the most extensive and prolonged fires. The material most vulnerable to high temperatures would probably be the lubricants on the moving parts, and well known high temperature lubricants could be employed in my invention. It is however, preferred to provide protective heat insulation material 83 on the frame casing as added protection against the more extensive flash fires.

In either case but particularly where such insulation is employed the present invention makes possible a positioning device which can be driven by a gas motor and at the same time can have its principal components sealingly protected from corrosive atmosphere, fire gases and flooding. Thus although gas motors are desirable in positioning devices because they do not generate heat as electric motors do, and therefor can be located in casings insulated against heat from external fires, a problem arises when it is attempted to seal such casing against corrosive atmosphere, fire gases and flooding. This problem arises because of the inevitable leakage of air from the high pressure air motor chambers and from the valves employed to control this high pressure air. If the casing in which the air motor is located is itself sealed to keep out corrosive atmosphere, fire gases and flooding liquids the air leakage into the casing will in time develop very high pressures therein which will be detrimental to the casing and which may adversely affect the operation of the gas motor if it is one in which the pressure within the casing opposes expansion of the high pressure chambers.

By providing in combination a positioning device having a gas motor and motor control valves within a casing which is sealed at the apertures 20 for the rods 18 and at an air supply pipe 84 and which is suitably vented at 85, the present invention solves the problems of entrance into the casing of a corrosive atmosphere, fire gases and flooding liquids without injuring the casing and without interfering with the proper operation of the air motor.

As illustrated in FIG. 1 a preferred embodiment of the invention calls for the exhausting of the air from the motor directly into the casting 22 from valve exhaust outlets 87, the casing being sealed except for the vent 85 and the vent either extending above any expected flooding liquid level or being provided with a trap portion 86 or both. In such an embodiment maximum protection against corrosive atmosphere, fire gases and flooding is achieved because the substantial flow of exhaust air out of the vent 85 prevents the entrance into the casing through the vent 85 of any outside atmosphere.

A suitable source of compressed air at a remote location is represented in FIG. 1 by an air compressor 88 which is provided with a filter 89 which removes oil, water and other foreign substances from the air before it is led to the positioner through pipe 84.

Thus in FIG. 1 the interior of the frame casing 22 is provided with cool, clean, dry air which is exhausted from the air motor and which flows out of vent 85. This prevents overheating of the parts from a fire which may transmit heat even through insulation 83, prevents corrosion of the parts even when the atmosphere around the position is corrosive, and prevents the inflow of hot gases in the event of a fire near the positioner.

Figures 3, 3A:
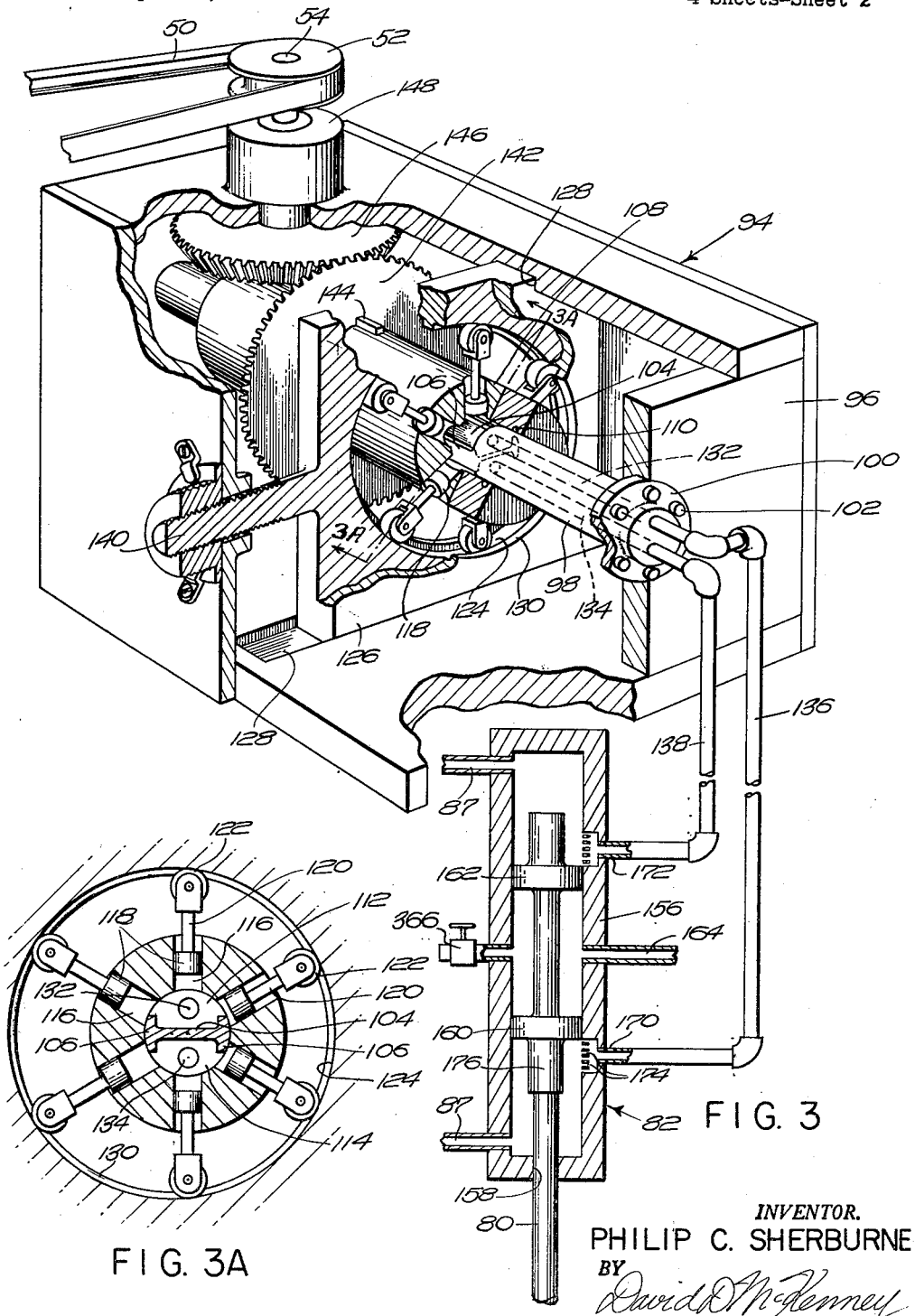
FIGURE 3 is a diagrammatic view of the device of FIG. 1 showing the gas motor in perspective and partially broken away and showing the main control valve cross sectioned.
FIGURE 3A is a fragmentary cross sectioned view taken on line 3A—3A.

FIGURE 3 illustrates in more detail the constructions of the air motor 64 and valve 82. The air motor has a frame 94 in the form of a box the ends 96 of which non-rotatably support a cylindrical shaft 98 having flanges 100 secured to the frame ends 96 in a conventional manner, for example by bolts 102. At substantially its middle portion the shaft 98 is notched on opposite sides to leave a center web 104 (see FIG. 3A) the edges 106 of which are widened substantially for a purpose hereinafter explained.

Surrounding this shaft 98 at the web and journalled on portions of the shaft beyond the ends of the web is rotatable cylinder 108 having seals 110 where it is thus journalled to provide two pressure tight chambers 112 and 114, one on either side of the web. Radial cylinders 116 each having a diameter no larger than the width of the web edges 106 are located at spaced intervals in the rotatable cylinder 108 adjacent the chambers. These cylinders are provided with pistons 118 having piston rods 120 carrying rollers 122 on their outer ends. The rollers engage a circular internal track 124 on a block 126 movably mounted in grooves 128 in the top and bottom of the frame at right angles to the axis of the shaft 98. The track is provided with lips 130 to retain the rollers and is so located in the block that at one position of the block in the grooves the track is concentric with the shaft 98 and rotatable cylinder 108.

The shaft 98 has two passages 132 and 134 one of which leads from one end of the shaft to the chamber 112 and the other of which leads from the same end of the shaft to the chamber 114.

The operation of this type of air motor is as follows: Assume air under pressure is admitted to passage 132 through pipe 136 and that air is free to exhaust from passage 134 through pipe 138. If the block 126 is positioned in the groove 128 to the left (in FIG. 3) of its concentric position and held there by a speed adjusting screw and nut assembly 140 the pressure in chamber 112 urges the pistons, which are above the web 104 and thus open to this chamber, outwardly. Because of the eccentricity of the track 124 with respect to the axis of rotation of the cylinder 108 the thrust on the pistons exposed to chamber 112 produces a component of force which rotates the cylinder 108 on the shaft 98.

As the pistons reach their most advanced positions in their cylinders they pass over the widened edges 106 of the web and become opened to the chamber 114. The eccentricity on this side of the web pushes the pistons inwardly, but there is little resistance to this because chamber 114 is connected through passageway 134 to a low pressure exhaust. As the cylinder 108 continues to rotate it drives the pistons to their innermost positions and then carries them across the other widened web edge from the exhaust chamber 114 to the pressure chamber 112 and the operation is repeated.

Air motors which operate on this principle are well known, and this diagrammatic showing is included here merely for a better understanding of the required operation of the valve 82.

A bevel gear 142 is keyed at 144 to the rotatable cylinder 108 and meshes with another bevel gear 146 journalled in a bearing 148 mounted on the top of the frame. Above this bearing the pulley 52 is fastened to the shaft 54 connected to the gear 146.

In an air motor of this kind the speed of rotation of the rotatable cylinder 108 can be varied by moving the block 126 back and forth in the grooves 128. The greater the eccentricity of the track 124 with respect to the cylinder 108 the faster the motor turns. The speed adjusting screw and nut assembly 140 provides a setting of the desired speed of the motor and hence the desired speed of the cross bar 24 of the jack mechanism. Necessarily the speed is set so that the cross bar 24 moves as fast as the maximum expected rate of pipe movement. Preferably the cross bar speed substantially exceeds the maximum expected pipe speed.

The air-motor shown and described is controlled by valve 82 which is actuated by the lever 74. This lever is connected at its end to the piston rod 80 which enters the cylinder casing 156 of the valve 82 through an opening 158 and carries within this casing a pair of spaced apart pistons 160 and 162 fitting nicely against the cylinder walls of the casing 156. Inlet connection 164 introduces the compressed air from the supply into the casing between the pistons 160 and 162. Exhaust connections 87 are located at opposite ends of the casing. Additional connections 170 and 172 join pipes 136 and 138, respectively, to the valve at the locations shown. The spacing of the pistons 160 and 162, the inlet 164 and the connections 170 and 172 are such that when the piston rod is held by the lever 74 in the position shown in FIG. 3 compressed air from the supply cannot enter the air motor through either pipes 136 or 138 and both chambers 112 or 114 of the air motor are exhausted through connections 87. However, if movement of the pipe causes the lever 74 to rotate, for example, clockwise, in FIG. 3 the piston rod 80 is moved downwardly with this lever and when the movement is sufficient so that the piston 160 begins to move below the connection 170 compressed air from inlet 164 is free to enter pipe 136 and from there chamber 112 of the air motor. The connection 170 is in the form of a manifold 172 with a series of small openings 174 to the interior of the valve casing. Thus as the piston 160 moves down it uncovers progressively more of the small openings 174 with the result that the pressure drop between the inlet 164 and the pipe 136 diminishes with increased downward movement of the piston rod 80. This throttling effect provides for small variations in pressure within the chamber 112, so that the speed of rotation of the air motor is somewhat self-adjusting to the speed of pipe movement. The lever 74 may find a position in which the pressure introduced into air motor chamber 112 provides that motor speed which just maintains the lever 74 in that position.

It is, however, within the scope of the invention to have the lever 74 move the valve rod 80 far enough to open the connection 170 completely and provide maximum air motor speed. As previously described this would raise the cross bar 24 of the jack mechanism faster than the upward movement of the pipe and rotate the lever 74 counterclockwise (in FIG. 3) to shut off the connection 170.

A stop 176 is provided to limit the downward movement of the piston 170.

If the movement of the pipe load is downwardly the lever 74 is rotated in a counterclockwise direction positioning the valve piston up from the position shown and connecting the inlet 64 to the pipe 138 in the manner described above with respect to the connection 170. This introduces the compressed air into chamber 114 and chamber 112 becomes the exhaust chamber and the direction of rotation of the motor is reversed. This reversal lowers the cross bar 24 of the jack mechanism.

In some installations it may not be necessary to prevent liquids from entering the positioner frame casing. Thus the positioner may be located in such a place that it cannot be flooded in the event of a ruptured pipe or vessel. In such a case it would be sufficient to rely on venting of air from the casing to prevent the entrance of corrosive atmosphere. Consequently a special vent such as shown at 85 in FIG. 1 is not necessary and apertures in the casing required for other purposes may be used as exits for air discharged into the casing. Thus in FIG. 4 the apertures 20 in the bottom of the casing 22 for the rods 18 are slightly larger than these rods providing the necessary air exits. Also the aperture 178 for the air supply pipe 84 may be somewhat larger than this pipe to provide another exit.

It is a feature of the invention that the vents or apertures in the casing also serve to compensate for changes in air volume within the casing. For example if the pipe is moving downwardly the air volume within the casing is increased thus tending to provide a partial vacuum within the casing and a tendency for air to be drawn into the casing if there were no vents. Conversely when the pipe is moving up the air volume within the casing is decreased and the tendency is for the air in the casing to attempt to escape. The vent 180 provides the double function of exhausting from the casing the exhaust air of the air motor and at the same time permits compensation for the changes in air volume within the casing.

FIGURE 5 illustrates that the exhaust from the air motor 180 may be piped outside the casing 182 through exhaust conduit 184 rather than be discharged into the casing as in FIGS. 1 and 4. A vent 186 from the inside of the casing to the outside is still necessary, however, because of the leakage of the air motor 180 and valve 188 when the apertures at 190 (for rods 192) and at 194 (for supply pipe 196 and exhaust pipe 184) are sealed and because of the necessity for compensating the change in air volume during operation.

FIGURE 6 illustrates that the present invention is not limited to positioning devices of the constant support hanger type, but also includes those positioning devices in which the operation of the air motor is in accordance with changes in some system condition other than load. Thus in FIG. 6 a main control valve 198 for the air motor (not shown) is operated in accordance with changes in temperature at some point in the piping system. More specifically, at this point a coil of oil-filled tubing 200 is wrapped around a pipe 202 and has one end 204 closed. From this coil the tubing extends to the positioning device and through the frame 206 thereof for connection with a bellows 208 housed in a cylinder 210 and also filled with oil 212. The volume of oil 212 in the tubing coil is large enough with respect to the volume of the bellows so that changes in the temperature of the oil caused by changes in the temperature of pipe 202 expands the oil sufficiently to move the upper end 214 of the bellows axially within the cylinder 210. To this upper end of the bellows there is connected a rod 216 pivotally joined to a lever 218 between one end thereof which is pivotally mounted on the cylinder at 220 and another end which lies between plungers 222 of a pair of pilot valves 224 and 226. In operation the thermal changes in volume of the oil 212 cause the lever 218 to be rotated and to operate the pilot valves 224 and 226. For example, assume that the temperature of the pipe 202 is increasing. This will produce an upward motion of the rod 216 and a counter clockwise rotation of the lever 218 about its pivot 220. This in turn will operate pilot valve 224 which operates main control valve 198 to turn on the air motor to move the nut member of a jack mechanism in one direction. Conversely a decrease in the temperature of the pipe 202 results in a contraction of the oil 212 and a clockwise rotation of the lever 218 which operates the pilot valve 226 which in turn operates the main control valve 198 to move the nut member of a jack mechanism in the opposite direction.

The design of the oil filled tubing, bellows and lever is such that the pipe section engaged by the positioner is moved along a prearranged path with the changes in temperature of the pipe 202. The equipment thus described is of a simple design and would result in a substantially linear relationship between temperature changes and movement of the pipe section by the positioning device but it will be understood that any desired programmed path could be achieved by suitable linkages and cams connecting the bellows 208 to the lever 218.

The pilot valves 224 and 226 are identical and a description of the former will serve for an understanding of both. A separate air supply pipe 228 brings compressed air to a passage 230 and through a restriction 232 therein to a bleed port 234 having a closure member 235 loaded by a spring 236 toward a seat 238. The pressure from the source and the strength of the spring 236 are arranged to that there is a slight leakage through the port 234 and an exhaust 240. As long as air is thus bleeding out the pressure in a chamber 242 on one side of a piston 244 is insufficient to move the piston to the right in its cylinder 246 against the force of another spring 248. If however the plunger 222 is moved upwardly closing port 234 pressure in chamber 242 rises sufficiently to move the piston 244 to the right. This causes piston 244 to close an exhaust port 250 from an intermediate chamber 252 between piston 244 and another piston 253 to which chamber there is also connected a pipe 254 leading to the main control valve 198. At the same time movement of piston 244 to the right carries the second piston 253 to open the supply pipe 228 to the chamber 252. The pipe 254 is not closed by either of the pistons in their movement to the right, and accordingly pressure from the supply 228 is connected through pipe 254 to the main control valve 198.

This pressure introduced into the main control valve moves a spring balanced multiple piston assembly 258 downwardly against the force of a spring 260 and opens a main control valve supply pipe 262 to an air motor connection 264. Another pipe 266 from the motor returns the air motor exhaust air to a chamber 268 which is exhausted through a portion 270 even when the piston assembly 258 has been moved downwardly. A second exhaust portion 272 which was connected to the pipe 264 through an intermediate chamber 274 when the main control valve piston assembly was in the balanced condition shown is closed from this pipe 264 by a piston 276 after the downward movement of the piston assembly.

If on the other hand the lever 218 rotates in a clockwise direction the pilot valve 226 is operated in a manner identical to that described for the pilot valve 224 and the main control valve piston assembly is moved upwardly causing pipe 266 to become the air motor supply and the pipe 264 to act as the air motor exhaust.

An advantage in using pilot valves such as those described rather than to operate the main valve directly as in the previous figures is that the air motor may be controlled by considerably smaller lever movements of the lever 218 than was the case of the lever 74 in FIG. 1. It will be noted that when the air motor is controlled in accordance with temperature changes in the piping system as in FIG. 6 it is unnecessary for control purposes to employ Belleville springs in the jack mechanism mounting unit 278 which in FIG. 6 contains only thrust bearings 280. Two thrust bearings are shown because in temperature controlled devices it may be necessary to exert a push as well as a pull on the pipe section to which the positioning device is secured. A frame boss 282 for the connecting rod 284 provides stability in the case where the force is being exerted downwardly (in FIG. 6) on this pipe section.

FIG. 7 shows another embodiment of the present invention in which a hydraulic jack 284 is employed instead of the mechanical jacks of FIGS. 1, 4 and 5. More particularly this hydraulic jack has a cylinder 286 and piston 288 therein connected to the fluid handling equipment by a piston rod 290. Variations in pressure of the hydraulic fluid 292 below the piston produces movement of the piston and consequently movement of the fluid handling equipment. The pressure of the fluid 292 is developed by a pump 294 driven by a gas motor 296, and operation of the motor 296 is controlled by a pilot valve 298 and control valve 300. This arrangement constitutes a constant support type of device as will be understood from the following description of the operation.

Assume that the piston rod 290 is connected to fluid handling equipment (not shown), and a frame casing 302 to which the cylinder 286 is secured is in turn mounted on building structure. The weight of the fluid handling equipment produces a pressure in the fluid 292 in the cylinder, and if thermal expansion of that equipment tends to move it upwardly this pressure decreases, with the result that the end 304 of a Bourdon tube 306 moves to the right (in FIG. 7) and actuates the pilot valve 298. Such actuation permits gas pressure from the supply line 308 to pass through the pilot valve and along a conduit 310 to chamber 312 in the control valve 300. This, in turn, results in an upward movement of the piston assembly 314 of this control valve compressing spring 316 therein and permitting pressure from the supply line 308 to pass to the motor 296 through a line 318. This motor 296 is of the type shown in FIG. 3 with an exhaust 320. However, unlike the motor of FIG. 3, this motor 296 need not be reversible. The resulting actuation of the motor 296 drives the pump 294 which takes fluid from a reservoir 322 and drives it through a pressure reducing valve 324 into the cylinder 286. When the pressure of the fluid 292 again reaches the desired level the Bourdon tube end 304 moves to the left and closes the pilot valve 298 which stops the motor 296. If the fluid handling equipment to which the piston rod 290 is secured continues its upward movement the above described operation will be repeated providing an on and off operation of the gas motor and pump and a corresponding upward movement of the hydraulic jack piston 288. Thus with small variations the force exerted on the fluid handling equipment is maintained substantially constant.

A spring 326 having one end connected to the end 304 of the Bourdon tube and having its other end adjustably connected to the frame by a screw 328 enables the pilot valve 298 to be set to open at different pressures in the fluid 292.

If due to thermal expansion or contraction the fluid handling equipment (not shown) moves downwardly, this increases the pressure in the fluid 292, and when this pressure exceeds a predetermined amount the pressure relief valve 330 in a conduit 332 opens and permits some of the fluid to pass back into the reservoir. Such an increase in pressure tends to move the end of the Bourdon tube to the left, but this is in a direction to maintain the pilot valve 298 closed so that there is not motor actuation by this increase in pressure.

Movement of the jack piston 288 in either direction rotates a fly wheel 334 threadedly engaged in this piston and provided with a spring loaded brake 336 which is normally held disengaged by the pressure of the fluid led to the brake cylinder 238 by a conduit 340. This brake is a safety feature, so that if the pressure of the fluid 292 is reduced sharply by a leak the brake will operate to prevent dropping the load.

In accordance with the present invention this device is completely enclosed and protected by the frame casing except for a vent 340 as in the previous figures.

FIGURES 8 and 9 illustrate a novel pilot valve construction in which the simple reversal of one unit converts the valve from a normally open type to a normally closed type. Thus FIG. 9 shows a pilot valve which is similar to the one shown in FIG. 6 in that gas from a supply 342 is constantly bled through a port 344 to an exhaust opening 346 when the actuating lever 348 (of the type shown at 218 in FIG. 6) is in its neutral position. If this lever 348 moves to the right in FIG. 9 the port 344 is closed and pressure from the supply 342 increases in the chamber 350 and actuates the double piston unit 352 to pass gas pressure from the supply to the conduit 354 and to close the exhaust port 355.

The port 344 is held open by a spring 354 which bears against one end of a cylinder liner 356 and against a closure plate 358 carried midway on a rod 360. One end of this rod engages a pilot valve plunger 362.

FIGURE 8 shows that if plug 364 which holds the cylinder liner 356 in place is removed and the cylinder liner reversed and if the spring 354 is located on the opposite side of the closure plate 358, the port 344 then becomes a normally closed port, and supply pressure in chamber 350 holds the double piston unit 352 down, permitting pressure from the supply 342 to pass through the pilot valve to conduit 354 leading to one end of the control valve. At the same time another pilot valve similar to the one shown in FIG. 8 (and whose plunger 362' is shown in FIG. 8) is employed in a similar fashion and normally supplies pressure to the other end of the control valve. This produces a balanced condition in the control valve which is thereby maintained closed.

If the lever 348 in FIG. 8 moves to the right and opens port 344 the pressure in chamber 350 drops and the double piston unit 352 moves upwardly to shut off the supply of gas through the pilot valve to the control valve. The other pilot valve, however, is not similarly affected by such a lever movement and accordingly the pressure it supplies to the lower end of the control valve actuates the control valve to admit gas pressure therethrough to the gas motor.

An advantage to using the normally open type of pilot valve shown in FIG. 8 is that there is not constant bleeding of air from the supply out of the pilot valve during long periods between desired motor operation. Such constant bleeding of air, as would result for example from the normally closed pilot valves of FIG. 9, has the advantage that it produces a constant flow of air out of the casing and prevents the entrance of outside fluids, as previously described, but it may be found more advantageous to employ for this purpose a special bleed for example like the adjustable bleed 366 in the control valve of FIG. 3 to obtain such a constant flow of air out of the casing.

The advantage of pilot valve construction shown in FIGS. 8 and 9 is that the cylinder liner 356 can be removed and reinserted backwards, so to speak, with the spring 359 located on the opposite side of the closure plate 358 and the pilot valve has been converted from a normally closed pilot valve to a normally open one or vice versa.

I claim:

1. A motor driven device for positioning fluid handling equipment of a fluid handling system in accordance with changes in a condition of the system caused by changes in the temperature of the system, said device compirsing a frame, a hydraulic jack having a cylinder mounted on a frame and having within the cylinder a piston from which a piston rod extends through one cylinder end, a fluid pump, a motor of the type which obtains its input energy from compressed gas led to the motor from an independent source of gas under pressure, means connecting said motor to said pump for causing said motor to drive said pump, a conduit connecting the fluid discharge of said pump to said cylinder between said piston and said cylinder end, an additional conduit connecting the fluid intake of said pump to said jack cylinder, a gas-tight casing enclosing said jack, motor and pump, a first gas conduit member leading gas under pressure through an opening in said casing to said gas motor, a control valve in said conduit within said casing, an opening in said casing through which said piston rod extends for connection outside said casing to fluid handling equipment, means located at least partially inside said casing for actuating said control valve in response to changes in said system condition, and a vent through said casing, whereby gas leaking or discharged within the casing may escape through said vent, and whereby the jack, motor, pump and control valve and said part of said control valve actuating means are protected from corrosive fluids outside of the casing.

2. For controlling a gas motor in a deivce for positioning a fluid handling equipment, a pilot valve comprising a first cylinder having an inlet, an outlet and an exhaust, a plunger in said first cylinder, resilient means urging said plunger into a first position in which a plunger passage itnerconnects said outlet and exhaust and in which said inlet is closed, a pressure chamber at one end of said plunger and connected to said inlet, said plunger being moved by a predetermined pressure in said chamber to a resilient position in which a plunger passage interconnects said inlet and outlet and in which said exhaust is closed, a bleed from said chamber into a second cylinder, a hollow liner in said second cylinder having an annular seat on the interior surface thereof, a shaft extending along the interior of said liner, a closure member carried on said shaft adjacent said seat, resilient means between said closure member and a portion of said liner, said liner having bleed ports therethrough on opposite sides of said closure member, whereby the liner may be inserted in the said second cylinder with the valve seat facing in one direciton or in the opposite direction and whereby the resilient means may be located on one side of the closure member to urge the closure member against the valve seat or on the opposite sides of the closure member to urge it away from said seat.

3. A motor-driven device for positioning fluid handling equipment of a fluid handling system in accordance with changes in a condition of the system caused by changes in the temperature of said system, said device comprising a frame, a jack having first and second components, one of which is rotatable relative to the other, one of which is movable linearly relative to the other by said relative rotation and one of which is mounted on said frame, whereby rotation of said rotatable component moves one of said components linearly with respect to said frame, means for connecting said equipment to said last-mentioned component, a multiple pressure chamber rotary gas motor having an intake and having an exhaust which is separate from said intake, said motor being of the type which obtains its energy from a continuous flow of compressed gas therethrough between said intake and said exhaust, means for continuously conducting compressed gas to said intake, means for connecting said gas motor to said rotatable jack component, a gas-tight casing enclosing said jack and said gas motor, said conducting and connecting means passing through said casing, a vent in said casing, and means for discharging into said casing at least a portion of the gas conducted thereto whereby corrosive atmosphere and fumes outside the casing are prevented from entering the casing by pressure maintained therein which is above the pressure outside said casing.

4. A device in accordance with claim 3 in which said casing has an opening for receiving said gas conducting means, in which said casing has additional openings for slidably receiving said connecting means, and in which said gas motor exhaust opens into the interior of said casing.

5. The device of claim 4 wherein said vent comprises at least one of said openings.

6. The device of claim 4 in which gas-tight seals are provided at said openings around said conducting and connecting means extending therethrough.

7. The device of claim 4 in which gas-tight seals are provided at said openings around said conducting and connecting means and in which said vent is provided with a liquid trap, whereby liquids flooding the exterior of the casing are prevented from entering said casing.

8. The device of claim 4 in which gas-tight seals are provided at said openings around said conducting and connecting means and in which said vent is provided with a check valve whereby substantially only flow of fluid out of the casing can take place.

9. The device of claim 4 in which gas-tight seals are provided at said openings around said conducting and connecting means and in which said vent is provided with a pressure relief valve whereby a pressure is maintained within the casing which is slightly higher than the pressure outside the casing.

10. The device of claim 4 in which gas-tight seals are provided at said openings around said conducting and connecting means and in which there are means for introducing gas into the casing independent of the operation of said valve and motor.

11. A motor-driven device for positioning fluid handling equipment of a fluid handling system in accordance with changes in a condition of the system caused by changes in the temperature of the system, said device comprising a frame, a mechanical jack having a first component which is mounted on said frame and having a second component which is interengaged with said first component, one of said components being rotatable, and said second component being linearly movable relative to said first component when said rotatable component is rotated, a motor of the type which obtains its input energy from compressed gas led to the motor from an independent sourrce of gas under pressure, said motor having a rotating output shaft, means for rotating said rotatable component by said motor output shaft to produce said second component linear movement, a gas-tight casing enclosing said jack and motor, a first conduit member leading gas under pressure through an opening in said casing to said gas motor, a control valve in said conduit within said casing, a connecting member connected within said casing to said second jack component and extending slidably through an opening in said casing for connection outside said casing to fluid handling equipment, means within said casing for actuating said control valve in response to changes in said system condition, said control valve actuating means comprising a load cell which is located between the jack and the frame and which has a part movable with changes in force exerted by the jack, and wherein said means further comprises a pilot valve connected to said load cell part and to said control valve, and a vent through said casing, whereby gas leaking or discharged within the casing may escape through the vent, and whereby the jack, motor, control valve and control valve actuating means are protected from corrosive fluids outside the casing.

References Cited in the file of this patent

UNITED STATES PATENTS 2,248,730 Wood _____ July 8, 1941
2,918,238 Zollinger _____ Dec. 22, 1959